O. GARDNER.
MOTOR VEHICLE.
APPLICATION FILED JUNE 25, 1914.
1,154,755.
Patented Sept. 28, 1915.
2 SHEETS—SHEET 2.
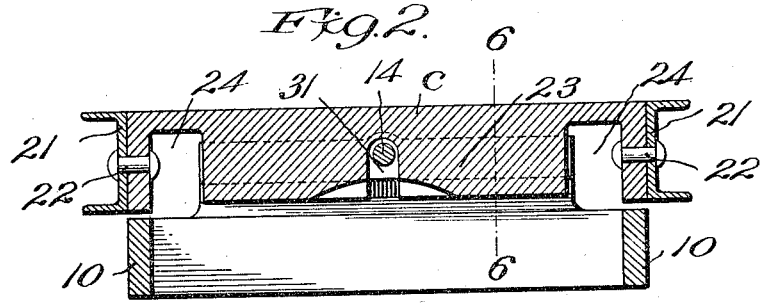
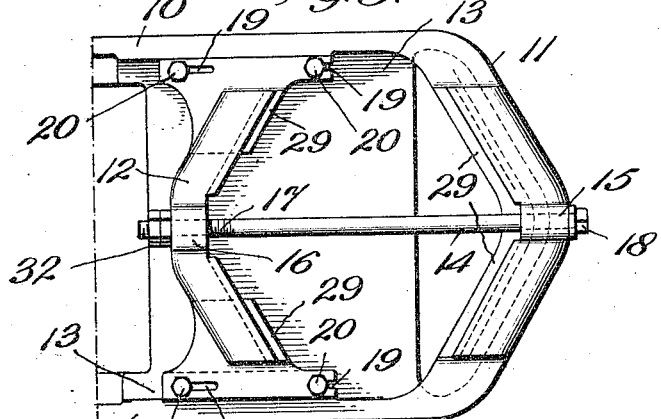
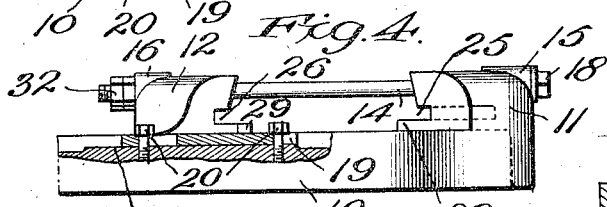
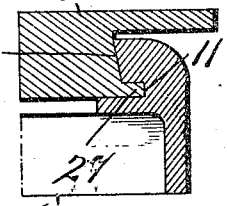
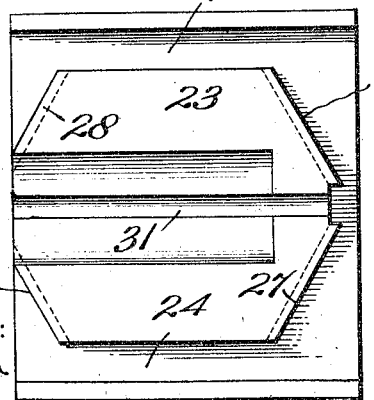
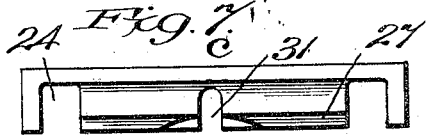
Otto Gardner,
Inventor
Witnesses:
C. Jas Cronin
M. E. Laughlin
By his Attorney Geo. A. Byrne

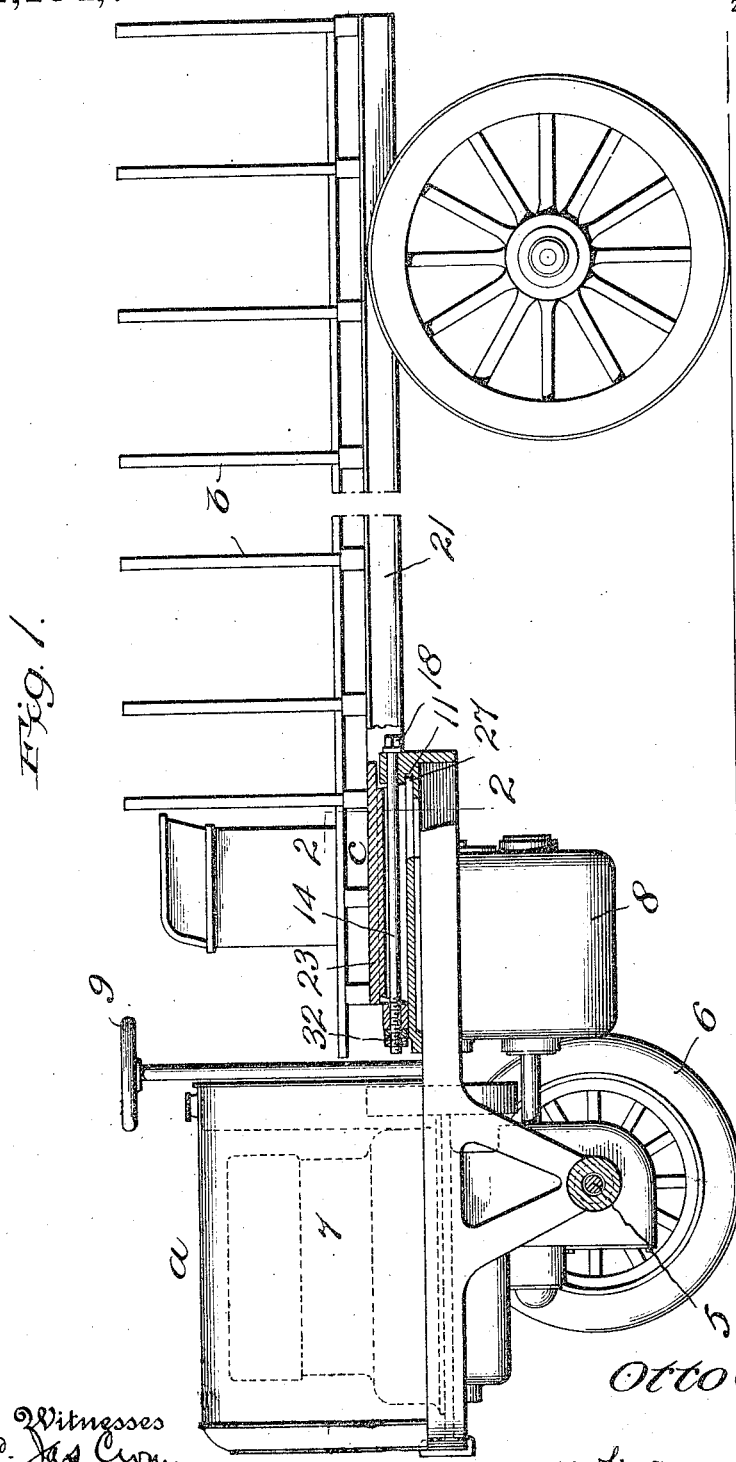

UNITED STATES PATENT OFFICE.

OTTO GARDNER, OF HOBOKEN, NEW JERSEY, ASSIGNOR TO GEM CONSTRUCTION CO., A CORPORATION OF NEW JERSEY.

MOTOR-VEHICLE.

1,154,755.  Specification of Letters Patent.  Patented Sept. 28, 1915.

Application filed June 25, 1914. Serial No. 847,240.

*To all whom it may concern:*

Be it known that I, OTTO GARDNER, a subject of the Emperor of Germany, and resident of Hoboken, in the county of Hudson and State of New Jersey, have invented certain new and useful Improvements in Motor-Vehicles, of which the following is a specification.

The invention has for its object to provide a device for effecting connection between the frame of a tractor and that of a load carrying vehicle in such manner that the said frames will be positively held against relative movement in any direction and held united with a degree of rigidity approximating that which would be had if the frames were an integral structure, and this without rendering the device other than a structure which will admit of effecting the disconnection of the said frames in a simple and expeditious manner whenever desired. And to this end the invention resides in providing one of the frames, for instance the load carrying frame with a male member and the tractor frame with a female member adapted for receiving the male member, rendering one of these members movable with respect to the other, and adapting each to interlock with the other when the movable member is moved in one direction.

Other objects will appear and be better understood from that embodiment of my invention of which the following is a specification, reference being had to the accompanying drawings forming part hereof, in which:—

Figure 1 is a contracted side elevation partly in section of a tractor and a load carrying vehicle showing my invention partly in section and in elevation and connecting the tractor and the load carrying vehicle. Fig. 2 is a detail cross section taken approximately on the line 2—2 of Fig. 1. Fig. 3 is a detail plan of the female part of the connector. Fig. 4 is a side elevation partly in section of the element shown in Fig. 3. Fig. 5 is a detail bottom plan view of the male part of the connector. Fig. 6 is a detail section showing the male and female members locked, and taken on the line 6—6 of Fig. 2. Fig. 7 is a detail front elevation of the male member.

The invention forming the subject-matter of the present application operates on the principle of a vise which is arranged on one of the frames to be connected together, while the other frame is adapted to permit of its being engaged by the vise and rigidly held thereby. In the embodiment shown the vise or female member is arranged on the frame of the tractor *a*, and the male part to be received by the said vise or female member is arranged on the frame of the load carrying vehicle *b*.

The frame of the tractor *a* is suitably adapted for carrying the shaft 5 of the driving wheels, one of which is shown and indicated by 6, also the motor 7, the transmission mechanism the casing of which is indicated by 8, and the various other parts which go to make up an operative tractor some of which are omitted from the drawings because of their impertinency to the present invention, and others of which are shown, such for instance, as part of the steering mechanism, the wheel of which is shown and indicated by 9.

The rear ends of the sides 10—10 of the tractor frame are connected by an end piece 11 which may be formed integral with the sides or otherwise suitably connected therewith. This end piece forms one component or jaw of the vise or female member. The other component or jaw of the female member is indicated by 12 and is mounted for movement on the plane surface of a bearing plate 13 which is formed integral or otherwise suitably connected to the sides 10—10. Suitable mechanism such as a screw 14, is employed for moving the jaw 12 toward or away from the jaw 11. This screw is mounted in bearings 15 and 16 arranged intermediate of the ends of the jaws 11 and 12 and in alinement one with the other. One of these bearings, such as the bearing 16, is threaded to coöperate with the threaded portion 17 of the screw 14. The outer end of the screw is provided with a non-cylindrical head 18 constructed so as to take a wrench or other suitable tool for turning the screw 14 to operate the jaw 12. As shown this head 18 is at the rear end of the tractor frame, and by virtue of this position access may be readily had thereto by an operator positioned below the frame of the load carrying vehicle and at the rear end of the tractor frame. It will be noted that the bearing plate 13 is positioned a trifle below the upper surfaces of the sides 10—10 of the tractor frame so that those portions of the sides extending above the plate 13 will function as guides for the movable jaw 12, the ends of which bear on the said projecting portions of the sides. Devices for supplementing the screw 14 to prevent upward tilting or displacement of the movable jaw 12, are provided and may be of any suitable construction; such devices are herein shown in the form of slots 19—19 formed in the movable jaw, and bolts or pins 20—20 extending through the said slots and fastened to the bearing plate 13.

The male member c is carried by the frame of the load carrying vehicle b, is disposed at the forward end of the frame of the said load carrying vehicle and connects with the sides 21—21 of that frame. This member c may be formed integral with the frame of the load carrying vehicle or suitably connected thereto, such as by pins 22. In its construction the male member includes a head 23 which is located well within the plane of the frame of the load carrying vehicle b so that when this frame is connected to the frame of the tractor the sides thereof may bear on the sides of the frame of the tractor a, or substantially so. The head may be formed in any suitable manner, such as by forming longitudinal recesses 24—24 in the lower face and adjacent to the opposite sides of the male member c.

In order that the head 23 and the jaws 11 and 12 may each present to the other a maximum of bearing surface consistent with the width of head and the length of jaw desirable in a connection of this kind, the said jaws are formed substantially V-shaped in contour and the ends of the head are shaped to correspond to the jaws. As will be noted by reference to Figs. 2 to 4 inclusive, the jaw 11 projects beyond the upper surface of the sides 10—10 of the tractor frame and is relatively wide and undercut on its inner surface to provide a groove 25. The dimensions of the jaw 12 approximate those of the jaw 11, and this jaw 12 is undercut on its inner surface so as to provide a groove 26. The grooves 25 and 26 receive tongues 27—27 and 28—28 formed with the ends of the head 23. It will be observed that the portions of the jaws overhanging the grooves 25—26 are appreciably shorter than the floors of the grooves, thus ledges 29—29 shown in Fig. 3, are provided for holding the tongues 27—27 centered with the grooves prior to adjusting the said tongues in the said grooves. By reason of the peculiar shapes of the jaws 11 and 12 and the contours of the ends of the head 23 together with the presence of the grooves 25 and 26 and tongues 27 and 28, it will be manifest that when the head 23 is vised as shown in Fig. 1, lateral displacement of the said head or lateral vibratory movement thereof will be positively prevented, while vertical vibratory movement will be prevented by the presence of the beveling 30 on the bearing surfaces of the head and the overhanging parts of the jaws 11 and 12 as shown in Fig. 6. In this connection it will be noted that the beveling 30 also operates to practically eliminate torque on the tongues 27 in the event of the connected frames tending to move relatively toward each other.

From the foregoing the operation of the invention will be largely understood. Preparatory to effecting the connection between the frames the jaw 12 is moved forwardly or away from the jaw 11 for a sufficient distance to permit of the introduction of the head 23 between the said jaws. Upon adjusting the head 23 between the jaws a recess 31 formed in the under side of the head, receives the screw 14 as shown in Fig. 2. In adjusting the head the tongues 27 are placed on the bottoms of the grooves 25 after which the screw 14 is turned with a suitable implement in a direction so as to move the jaw 12 toward the jaw 11. This movement on the part of the jaw 12 is continued until the several tongues are completely nested within the grooves 25 and 26 and the bevel surfaces 30 in contact one with the other. After which suitable nuts or equivalent locking devices 32 are applied to the end of the screw to prevent accidental turning movement thereof.

What is claimed as new is:

1. In combination with the overlapping end portions of a load carrying vehicle frame and a tractor frame; of means for connecting the said overlapping end portions together and including a movable jaw carried by one of said end portions, and a head carried by the other of said end portions, said jaw and said head being further adapted to interfit and to interlock one with the other when the movable jaw is adjusted into one position and to disengage one from the other when the movable jaw is adjusted into another position.

2. Means for connecting together the overlapping end portions of a tractor frame and a load carrying vehicle frame, and comprising a pair of members carried by the said overlapping end portions, said members being constructed and arranged so as to interfit and to interlock one with the other, said jaw and said head being further adapted to interfit and to interlock one with the other when the movable jaw is adjusted into one position and to disengage one from the other when the movable jaw is adjusted into another position, one of said members being superimposed on one of the overlapping end portions, and the other depending from the other of said overlapping end portions.

3. In a device for connecting a tractor frame to a load carrying vehicle frame, a pair of jaw members, one of which is stationary and the other movable, and means for adjusting the movable jaw member with respect to the stationary jaw member for the purpose set forth.

4. In a device for connecting a tractor frame to a load carrying vehicle frame, a pair of angular shaped jaw members, one of which is stationary and the other movable, and means for adjusting the movable jaw member with respect to the stationary jaw member for the purpose set forth.

5. In a device for connecting a tractor frame to a load carrying vehicle frame, a pair of angular shaped under-cut jaw members, one of which is stationary and the other movable, and means for adjusting the movable jaw member with respect to the stationary jaw member for the purpose set forth.

6. In a device for connecting a tractor frame to a load carrying vehicle frame, a head or male member adapted to be connected to one of said frames and having horizontally disposed angular shaped end portions.

7. In a device for connecting a tractor frame to a load carrying vehicle frame, a head or male member adapted to be connected to one of said frames and having angular shaped end portions, each of which is provided with a marginal flange.

8. In combination, a tractor frame and a load carrying vehicle frame, one of said frames being provided with a female member in the form of a vise having angular-shaped jaws, and a male member carried by the other frame and having angular-shaped ends corresponding to the shapes of the jaws and gripped thereby.

9. In combination, a tractor frame and a load carrying vehicle frame, a female member in the form of a vise arranged on one of said frames and having undercut jaws and a male member disposed on the other of said frames and arranged in the female member and having tongues located in the said undercut portions.

10. In combination, a tractor frame and a load carrying vehicle frame, a female member in the form of a vise disposed on one of the frames and having angular-shaped undercut jaws, and a male member disposed on the other of said frames and having angular shaped ends engaged by the said jaws, and tongues disposed in the undercut portions of the said jaws.

11. In combination, a tractor frame and a load carrying vehicle frame, a female member in the form of a vise disposed on one of said frames and having jaws provided with beveled gripping surfaces, and a male member disposed in the other of said frames and having beveled end portions engaged by the beveled gripping surfaces of said jaws.

12. A vehicle frame having the sides thereof connected at one end by an end piece in the form of a stationary jaw, a movable jaw supported by the frame and disposed between the sides thereof, means for moving the movable jaw toward and away from the stationary jaw, in combination with a second vehicle frame having one end portion thereof adapted to be clamped by the jaws of the first named frame.

Signed at New York in the county of New York and State of New York this 19th day of June A. D. 1914.

OTTO GARDNER.

Witnesses:
 A. M. LINDENSTRUTH,
 M. E. LAUGHLIN.